Aug. 24, 1954
C. S. ROBINSON
2,687,270
VIBRATION ABSORPTION BEAM MOUNT
Filed Nov. 21, 1950
2 Sheets-Sheet 1
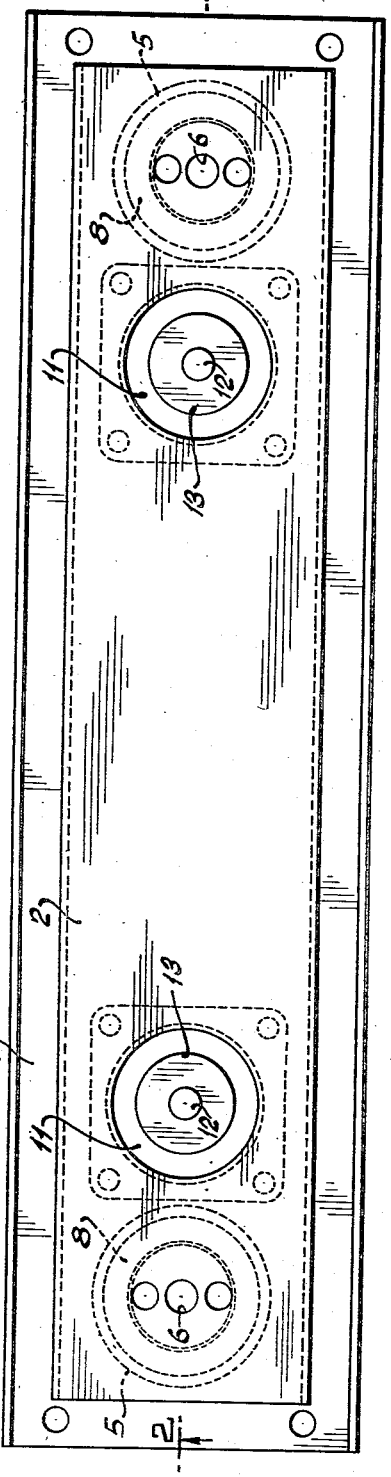
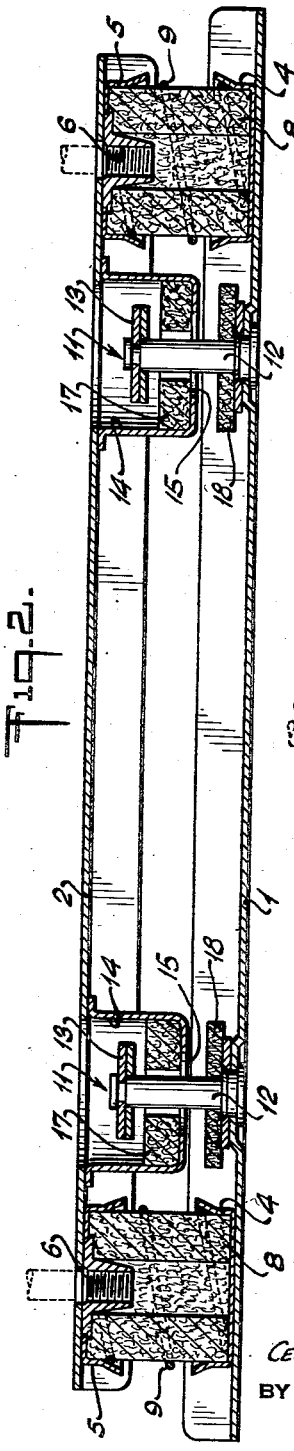
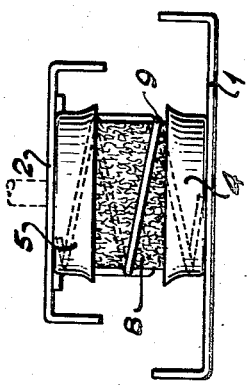
INVENTOR
CECIL S. ROBINSON
BY
ATTORNEY

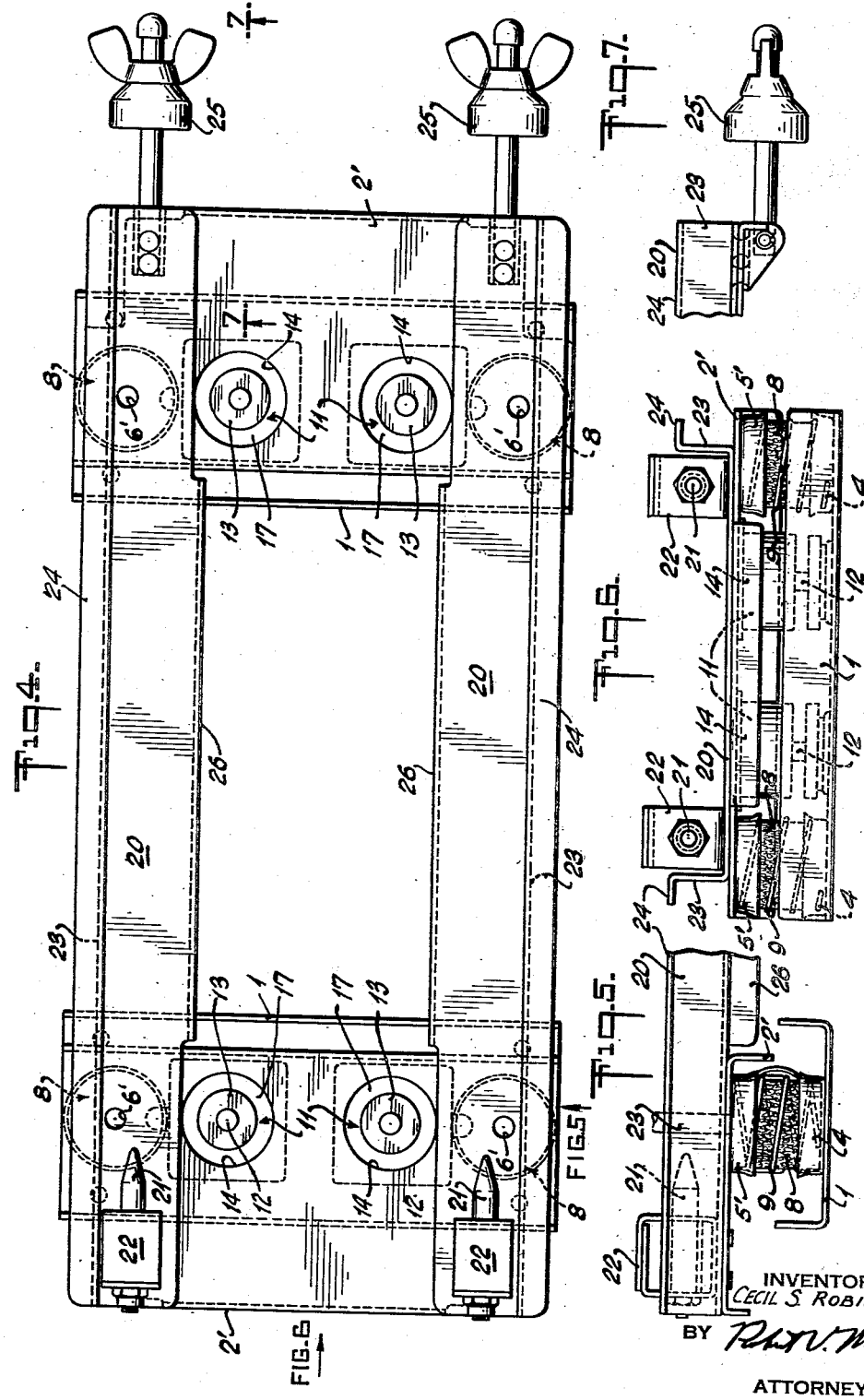

Patented Aug. 24, 1954

2,687,270

UNITED STATES PATENT OFFICE 2,687,270

VIBRATION ABSORPTION BEAM MOUNT

Cecil S. Robinson, Ithaca, N. Y., assignor to Robinson Aviation, Inc., Teterboro, N. J., a corporation of New York Application November 21, 1950, Serial No. 196,838

2 Claims. (Cl. 248—358)

This invention relates to the absorption of mechanical vibrations and shocks. The problem of protecting delicate apparatus from the bad effects of continuous vibrations is a serious one, since the correct functioning of such instruments is often of vital importance. The present invention is a vibration insulating beam of high absorptive powers, readily adaptable to mounting and demounting radios, cameras, instruments, and other such objects. In many cases it can be used to advantage in place of a greater number of separate unit mounts, particularly when the supported apparatus must be removed occasionally for inspection and repair. This protective device has a wide range of load tolerance, excellent characteristics as regards vibration and shock resistance, good damping action to prevent resonance, and it is unaffected by oil, moisture, or extremes of temperature, so that it is durable and functions satisfactorily in all climates and at all altitudes. It can be applied to most installations without re-designing the instrument which it carries. Various other advantages will become apparent as the description proceeds.

Referring now to the drawings forming part of this specification,

Fig. 1 is a plan view of a single beam mounting unit.

Fig. 2 is a longitudinal cross-section taken on the line 2—2 of Fig. 1.

Fig. 3 is an end elevation view of the beam unit shown in Fig. 1 and Fig. 2.

Fig. 4 is a plan view of an instrument tray or mounting base having a pair of such beam units.

Fig. 5 is a side elevation of one end of the tray showing a beam unit in elevation.

Fig. 6 is an end elevation view of the assembly as viewed from the left in Fig. 4.

Fig. 7 is a detail view of a clamping device for holding an instrument in place on the mount.

Similar reference numerals refer to similar parts thruout the various views.

Taking up first the single beam mount shown in Fig. 1, Fig. 2 and Fig. 3, it will be seen that the base 1 is a channel section or plate having upturned side walls extending the length of the base. The upper beam 2 is also a channel section or plate having downwardly extending side walls or flanges extending the length of the upper beam. The width of the upper beam 2 is different from that of the base 1, as clearly shown in Fig. 1 and Fig. 3, so that their flanges will not interfere. Cup shaped sockets 4 are secured to the upper face of the base 1 near its ends. Opposite these sockets 4 there are fastened to the under side of the upper beam 2 inverted socket cups 5 which are provided with a heavier center having a tapped hole 6 so that the instrument or article to be supported can be screwed on to the mount. Various other fastening holes can be provided in the upper beam to suit various installations.

The principal vibration absorption elements are located in the cup sockets described so as to support the apparatus, and consist of cushions 8 of particular construction, so as to provide the vibration absorption and damping characteristics desired. These cushions 8 consist of a body of fine, intermingled springy metallic wires formed into a coherent unit by a powerful press or otherwise contained so that it may thereafter be handled as a unit of a certain general shape and thus be capable of being inserted or removed from the sockets 4 and 5. The wires are very small in diameter—about the order of a hair or bristle—and the pressure of the forming process upon the mass crimps many of them at innumerable points beyond their elastic limit so that they take a more or less permanent set that tends to bind them together into a coherent whole.

Such a unit may be defined as a mass of compacted metallic wires extending in various directions and contacting each other at innumerable points of support so that the short strands of wire between such points act as vibration absorption springs while the points of contact between the wires act as frictional snubbers to produce in the aggregate a metallic vibration absorption material whose modulus of elasticity changes markedly under increasing amplitude so as to resist resonance and shock. It is characterized by high hysteresis due to interwire friction, while at the same time having a delicate sensitivity due to the springiness of very fine wires. While the wires are of such a multifarious character that they cannot individually be subjected to engineering analysis, they can be studied in the mass, where their load-deflection curve is characterized by a pronounced curvature, much more than that found with ordinary metal coil springs or with rubber.

The precompressed mass of wires is preferably enclosed in a light sleeve or cover of woven or knitted metal fabric to help hold it together. Any springy wire material of that general order of size may be used for the wires, but it is preferably non-corrosive material such as stainless steel, nickel alloys, or beryllium copper where permanence under adverse conditions is desired. Such material is available on the market, being made in quantity principally for scrubbing or filtering of liquids; and it has special advantages in a vibration absorption combination due to its peculiar load-deflection characteristics. The cushion 8 may be supplemented by helical wire springs 9 if desired, inserted in or around it so as to take part of the load and assist in holding the cushion in shape.

The cushions 8 and 8 are located near the opposite ends of the beam structure 1 and 2 so that they share the load and may be differently loaded at times. The characteristics of the compacted wire cushions described are such that the modulus of elasticity changes with different degrees of compression, quite unlike the rather constant modulus of elasticity of an ordinary spring. The two point construction connected by a rigid beam takes advantage of that and tends to prevent the development of harmonic oscillations, since harmonics that develop in one cushion might be out of step with the other cushion which due to a different loading would have a different natural period.

The high hysteresis characteristic of the construction not only tends to stop harmonics, but also is most effective against shocks, since its resistance under extreme impacts builds up very rapidly as the limiting positions are approached. To make the final impact in overloads and shocks, there are provided limiter mechanisms 11 consisting of studs 12 securely fastened to the base rail 1 as shown in Fig. 2 and extending upward part way to the top of the upper beam 2—leaving enough clearance at the top to allow full compression of the cushion 8 without the stud 12 projecting above the top beam 2. Washers 13 are attached near the top of the studs 12, and cup shaped brackets 14 are attached to the under side of the upper beam 2 and extend down around the studs 12 and washers 13. A hole 15 in the bottom of each cup permits the stud 12 to extend up thru, the hole being greater in diameter than the diameter of the stud 12 so that the stud 12 will not touch the metallic walls of the cup 14.

In the bottom of each cup 14 is a thick pad 17 of resilient material, preferably of compacted fine wires such as used in the main cushions 8—this pad 17 having a hole in the middle with clearance all around the stud 12. The hole in the pad 17 is smaller than the hole in the bottom of the cup so that if lateral vibrations occur the stud 12 will be laterally cushioned by the resilient pad 17 without striking the hard metallic cup 14. A second annular pad 18 of the same wire material is located near the base 1 and around the stud 12 to act as a cushioned limit stop in cases of extreme compression; while the cushion pad 17 impinges on the bottom of the washer 13 in case of rebound or extended upward movement. The beam assembly is thus held securely together even under excessive or inverted loads.

It will be noted that the rebound limiter mechanisms are so mounted as not to increase the overall height of the beam assembly and that the principal resilient cushions 8 utilize practically the entire height between the lower and upper beams. This permits the maximum height of resilient material to be used in the main vibration absorption cushions 8 and increases the effectiveness of the device.

Where a single one of the beam assemblies such as shown in Fig. 1, Fig. 2 and Fig. 3 is used, the load is generally mounted lengthwise on the upper beam. That suffices when the supported object is relatively small. Two or more of the beam assemblies may be used for larger loads, or in combination with a mounting tray as shown in Fig. 4 to Fig. 7 inclusive. There the two beam assemblies are placed crosswise under the two ends of a mounting tray.

In the modern airplane for example there are various intricate instruments and pieces of apparatus such as radios which may occasionally cease to function and need repair. The field personnel is not ordinarily capable of repairing them, and it is impractical to tie up the airplane while some specialist works on that particular part. Hence they are designed so that the field men need only to be trained to pull out a particular piece of apparatus and insert a new one—sending the old one back to the factory for repair. This is especially necessary in military operations where time for training is limited and steady use of the airplane is essential.

In Fig. 4, Fig. 5, Fig. 6 and Fig. 7 there is shown a mounting tray 20 for a radio or other apparatus, involving more than one vibration absorption beam and forming a permanent fixture or base to which the apparatus can be quickly attached or removed. The back of the tray, being the left hand side in Fig. 4 and Fig. 5, is provided with a pair of tapered aligning prongs 21 fixed in brackets 22. These prongs 21 fit into suitable holes in the radio or other apparatus that may be slid on to the tray so as to hold it securely at the back. The base of the apparatus fits between the side walls 23 to secure it against lateral displacement, while part of it may or may not rest on top of the flanges 24 shown best in Fig. 6. After the supported apparatus is slid into place it is held from sliding out by the clamps 25 shown at the right in Fig. 4 and in Fig. 7. These clamps can be screwed down tight against the face of the apparatus.

The tray 20 is stiffened longitudinally by the side walls 23 and the depending flange 26 (see Fig. 5). Neither of these lies between the load and the vibration absorbing cushions, so that practically all of the vertical space below the mounted apparatus is available for the vibration absorption cushions. As previously explained, the vibration absorption beams are also so constructed that the cushion elements extend for substantially the entire height of the unit. It will be seen then that the base of the supported apparatus is practically at the top of the supporting cushions, except for a slight thickness of sheet metal. This permits the maximum amount of cushioning material to be used and gives stability and vibration absorption efficiency to the device.

Taking up the vibration absorption more in detail, the base channels 1 with their upturned side flanges extend across the width of the entire mount transverse of the tray, they have mounted upon them cupped sockets 4 as best seen in Fig. 5 and Fig. 6. These sockets 4 hold the main supporting cushions 8, similar to those described in connection with Figs. 1, 2 and 3. There are four of these cushions in the mount shown in Fig. 4—one in each corner.

The upper beam 2' is also a channel section, somewhat similar but wider than the beam 2 in Fig. 3; and, as in Fig. 3, its downwardly extending flanges are out of line with the upwardly extending flanges of the base 1 so that neither limits the height of the other and the full height of the cushions 8 can be utilized. Inverted socket cups 5' are provided to hold the top of the cushions 8; and these sockets 5' are secured to the underside of the cross beam 2'. Holes 6' are provided by which the load can be screwed or bolted permanently if desired.

The limiter mechanisms 11 are similar to those in Fig. 1, Fig. 2 and Fig. 3, having the studs 12 fastened to the base channel 1 and the cup shaped brackets 14 attached to the under side of the upper beam 2'. The mounting tray 20 is rigidly secured to the upper side of the cross beams 2' which are the upper part of the vibration absorbing mechanism so that any external vibrations must pass thru the cushions 8 and be substantially absorbed by their hysteresis characteristics before they can damage the apparatus that may be mounted on the tray 20. In addition their shock resistance is high, particularly since the mass of compacted wires changes its effective modulus of elasticity as it is compressed and gives a more gradual approach to the limiting terminal position than would be the case with rubber, felt or coil springs of the ordinary construction.

Extensive tests have shown these vibration absorption beams to have wide load tolerance, long life, high damping action, uniformity at high and low temperatures so that they remain effective under any climatic conditions, and that they have good shock absorption combined with vibration insulation. Their minimum space requirements and plane exteriors permit them to be applied to many products and installations where effective vibration insulation and shock absorption are desired, without requiring re-design of the vehicle or mounted apparatus.

While I have in the foregoing described certain specific forms by way of example, it will be understood that they are merely for the purpose of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. In a vibration absorption mount the combination of a base plate; a supporting plate for mounting a load to be protected from vibration, said supporting plate being spaced from and normally located above said base plate; a plurality of unitary resilient members disposed in horizontally spaced relation between said plates for supporting and protecting from vibration the load mounted on said supporting plate, each of said unitary resilient members comprising a cylindrical cushion and a helical spring surrounding said cushion and in contact therewith, each of said cushions having progressively decreased increments of axial deflection under uniform increments of axial load and being made up of a mass of springy wires crimped at innumerable points beyond their elastic limit and intermingled so as to bind them together into a coherent body, said wires extending in various directions and contacting each other at innumerable points of support so that the short spans of wire between said points act as vibration absorption springs and points of contact between the wires act as frictional snubbers, the cushion and helical spring making up each of said resilient elements each extending axially for substantially the full distance from one plate to the other and together serving to support a portion of the load carried by said supporting plate, the cushion in each of said resilient members serving also to damp in a highly effective non-linear manner vibratory motion of the supported load, and the helical spring in each of said main resilient members also assisting in holding said cushion in substantially cylindrical shape and in axial alignment during deflection of said unitary resilient members incident to absorption of vibration or shock between said supporting plate and said base plate.

2. In a vibration absorption mount the combination of a base; a load supporting member for mounting a load to be protected from vibration, said load supporting member being spaced from said base; a unitary resilient member extending between said base and said load supporting member for supporting and protecting from vibration the load mounted on said load supporting member, said unitary resilient member comprising a cylindrical cushion and a helical spring surrounding said cushion and in contact therewith, said cushion having progressively decreased increments of axial deflection under uniform increments of axial load and being made up of a mass of springy wires crimped at innumerable points beyond their elastic limit and intermingled so as to bind them together into a coherent body, said wires extending in various directions and contacting each other at innumerable points of support so that the short spans of wire between said points act as vibration absorption springs and points of contact between the wires act as frictional snubbers, the cushion and helical spring each extending axially for substantially the full distance from the base to said load supporting member and together serving to support the load carried by said load supporting member, the cushion serving also to damp in a highly effective non-linear manner vibratory motion of the supported load, and the helical spring in each of said main resilient members also assisting in holding said cushion in substantially cylindrical shape and in axial alignment during deflection of said unitary resilient members, incident to absorption of vibration or shock between said load supporting member and said base.

References Cited in the file of this patent

UNITED STATES PATENTS

| Number | Name | Date |
|---|---|---|
| 2,032,659 | Hussman | Mar. 3, 1936 |
| 2,441,510 | Robinson | May 11, 1948 |
| 2,447,712 | Nathan | Aug. 24, 1948 |
| 2,462,316 | Goodloe | Feb. 22, 1949 |
| 2,470,185 | Pietz | May 17, 1949 |
| 2,519,702 | Robinson | Aug. 22, 1950 |
| 2,597,244 | Hussman | May 20, 1952 |